United States Patent
Ueba et al.

(10) Patent No.: US 10,992,823 B2
(45) Date of Patent: Apr. 27, 2021

(54) INFORMATION PROCESSING DEVICE TO STORE LOG INFORMATION DURING COMMUNICATION FAILURE

(71) Applicants: Ryohta Ueba, Kanagawa (JP); Sumihiro Inokuchi, Kanagawa (JP); Yuki Sunagawa, Kanagawa (JP); Kenichi Yamada, Kanagawa (JP); Tasuku Kohara, Tokyo (JP); Xiaoya Sun, Kanagawa (JP); Ryotaro Konno, Kanagawa (JP)

(72) Inventors: Ryohta Ueba, Kanagawa (JP); Sumihiro Inokuchi, Kanagawa (JP); Yuki Sunagawa, Kanagawa (JP); Kenichi Yamada, Kanagawa (JP); Tasuku Kohara, Tokyo (JP); Xiaoya Sun, Kanagawa (JP); Ryotaro Konno, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 16/787,108

(22) Filed: Feb. 11, 2020

(65) Prior Publication Data
US 2020/0259963 A1    Aug. 13, 2020

(30) Foreign Application Priority Data
Feb. 12, 2019    (JP) .............................. JP2019-022737

(51) Int. Cl.
*H04N 1/00* (2006.01)
(52) U.S. Cl.
CPC ....... *H04N 1/00074* (2013.01); *H04N 1/0001* (2013.01); *H04N 1/00029* (2013.01); *H04N 1/00037* (2013.01)

(58) Field of Classification Search
CPC ........... H04N 1/00084; H04N 1/00074; H04N 1/0001; H04N 1/00029; H04N 1/00037;
(Continued)

(56) References Cited

U.S. PATENT DOCUMENTS

| 2008/0174819 A1 | 7/2008 | Hada |
| 2019/0199211 A1 | 6/2019 | Ueba et al. |

(Continued)

FOREIGN PATENT DOCUMENTS

| JP | 2000-188651 | 7/2000 |
| JP | 2003-150211 | 5/2003 |

(Continued)

OTHER PUBLICATIONS

Extended European Search Report dated Jun. 25, 2020 in European Patent Application No. 20156299.8, 7 pages.

*Primary Examiner* — Kent Yip
(74) *Attorney, Agent, or Firm* — Oblon, McClelland, Maier & Neustadt, L.L.P.

(57) ABSTRACT

An information processing device includes control circuitry. The control circuitry is configured to store, in a first memory, record information formed each time a predetermined event occurs in a device and perform an update process of successively updating an old piece of record information with a new piece of record information in the record information stored in the first memory; transmit the record information stored in the first memory via a first signal line; transfer communication abnormality record information stored in the first memory to a second memory, which is configured not to update record information, and store the communication abnormality record information in the second memory when a communication abnormality signal of the first signal line is supplied via a second signal line; and transmit the communication abnormality record information stored in the (Continued)

second memory via the first signal line when communication of the first signal line is restored.

8 Claims, 6 Drawing Sheets

(58) Field of Classification Search
CPC ............... G06F 11/079; G06F 11/1471; G06F 11/0703; G06F 3/1236
USPC ........................................................ 358/1.15
See application file for complete search history.

(56) References Cited

U.S. PATENT DOCUMENTS

| 2019/0212289 A1 | 7/2019 | Kushida et al. |
| 2019/0258439 A1* | 8/2019 | Egami ................. G06F 11/0733 |

FOREIGN PATENT DOCUMENTS

| JP | 2012-045874 | 3/2012 |
| JP | 2013-131893 | 7/2013 |
| JP | 2014-149676 A | 8/2014 |
| JP | 2018-14039 A | 1/2018 |

* cited by examiner

INFORMATION PROCESSING DEVICE TO STORE LOG INFORMATION DURING COMMUNICATION FAILURE

CROSS-REFERENCE TO RELATED APPLICATION

This patent application is based on and claims priority pursuant to 35 U.S.C. § 119(a) to Japanese Patent Application No. 2019-022737, filed on Feb. 12, 2019, in the Japan Patent Office, the entire disclosure of which is hereby incorporated by reference herein.

BACKGROUND

Technical Field

Aspects of the present disclosure relate to an information processing device, an image forming apparatus, an image forming system, and an information processing method.

Discussion of the Background Art

At present, there is known an electronic device that stores log information at the time of occurrence of an abnormality in order to analyze a cause when the abnormality occurs.

In addition, there is known a machine scheduled suspension checking system capable of separately detecting abnormal suspension of a machine and scheduled suspension during maintenance among a normal operation, scheduled suspension, and abnormal suspension corresponding to operation information of a monitored machine when an operation of the monitored machine is checked from a monitoring machine.

In such a machine scheduled suspension checking system capable of performing detection, a machine operation checking processor checks the operation of the monitored machine, and a scheduled suspension flag file transfer processor transfers scheduled suspension information of the monitored machine to the monitoring machine and stores the information in a scheduled suspension flag file storage area. A machine operation checking table update processor reflects the scheduled suspension information stored in the scheduled suspension flag file storage area in a database of a machine operation checking table.

Furthermore, there is also known an electronic device that stores log information in a large-capacity memory of a master-side central processing unit (CPU) (management-side) while filing the log information, and refers back to the log information when an abnormality occurs in the case where mutual communication is disconnected, thereby being able to detect a state at the time of occurrence of the abnormality.

SUMMARY

In an aspect of the present disclosure, there is provided an information processing device that includes control circuitry. The control circuitry is configured to store, in a first memory, record information formed each time a predetermined event occurs in a device and perform an update process of successively updating an old piece of record information with a new piece of record information in the record information stored in the first memory; transmit the record information stored in the first memory via a first signal line; transfer communication abnormality record information corresponding to the record information stored in the first memory to a second memory, which is configured not to update record information, and store the communication abnormality record information in the second memory when a communication abnormality signal indicating a communication abnormality of the first signal line is supplied via a second signal line; and transmit the communication abnormality record information stored in the second memory via the first signal line when communication of the first signal line is restored.

In another aspect of the present disclosure, there is provided an image forming apparatus that includes the information processing device and an image forming device configured to form a predetermined image.

In still another aspect of the present disclosure, there is provided an image forming system that includes a first image forming apparatus, a second image forming apparatus, the first signal line, and the second signal line. The first image forming apparatus is configured to form an image. The second image forming apparatus is the above-described image forming apparatus configured to form an image. The first signal line connects the first image forming apparatus and the second image forming apparatus for communication. The second signal line connects the first image forming apparatus and the second image forming apparatus for communication. The first image forming apparatus includes control circuitry configured to transmit the communication abnormality signal indicating the communication abnormality of the first signal line to the second image forming apparatus via the second signal line when the communication abnormality of the first signal line is detected; and acquire the communication abnormality record information corresponding to the communication abnormality of the first signal line transmitted from the second image forming apparatus via the first signal line and store the acquired communication abnormality record information in a communication abnormality memory when communication of the first signal line is restored. The control circuitry of the second image forming apparatus is configured to transmit the communication abnormality record information stored in the second memory to the first image forming apparatus via the first signal line when communication of the first signal line is restored.

In still yet another aspect of the present disclosure, there is provided an information processing method comprising: storing, in a first memory, record information formed each time a predetermined event occurs in a device; performing an update process of successively updating an old piece of record information with a new piece of record information in the record information stored in the first memory; transmitting the record information stored in the first memory via a first signal line; transferring communication abnormality record information corresponding to the record information stored in the first memory to a second memory, which is configured not to update record information and causing the second memory to store the communication abnormality record information when a communication abnormality signal indicating a communication abnormality of the first signal line is supplied via a second signal line; and transmitting the communication abnormality record information stored in the second memory via the first signal line when communication of the first signal line is restored.

BRIEF DESCRIPTION OF THE DRAWINGS

A more complete appreciation of the disclosure and many of the attendant advantages and features thereof can be readily obtained and understood from the following detailed description with reference to the accompanying drawings, wherein.

Figure 1:
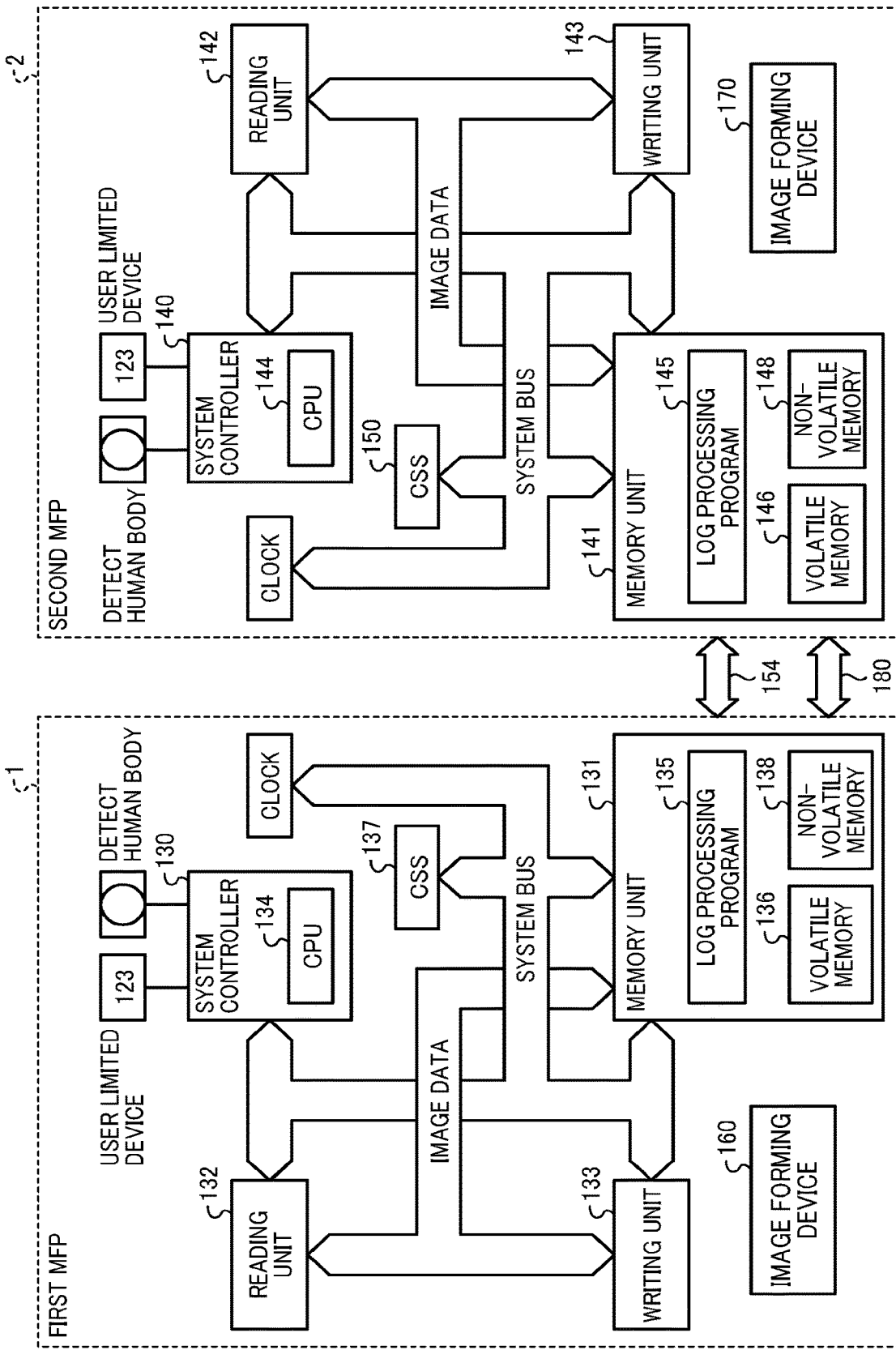
FIG. 1 is a system configuration diagram of an image forming system of an embodiment.

The accompanying drawings are intended to depict embodiments of the present disclosure and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present disclosure. As used herein, the singular forms "a", "an" and "the" are intended to include the plural forms as well, unless the context clearly indicates otherwise.

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Hereinafter, an image forming system of an embodiment will be described with reference to the accompanying drawings.

System Configuration

FIG. 1 is a system configuration diagram of an image forming system of an embodiment. As illustrated in FIG. 1, the image forming system of the embodiment is formed by interconnecting a first MFP 1 and a second MFP 2 through a normal signal line 154 and an emergency signal line 180. Referring to interconnected MFPs, three or more MFPs may be interconnected to form the image forming system.

For example, the MFPs 1 and 2 include image forming devices 160 and 170 (examples of an image forming unit), respectively, having image forming functions such as a copy function, a scanner function, a printing function, and a facsimile transmission/reception function. Note that any one of the image forming functions may be provided, or a plurality of the image forming functions may be provided.

Further, in addition to the image forming device 160 having such an image forming function(s), the first MFP 1 includes a system controller 130, a memory unit 131, a reading unit 132, a writing unit 133, and a customer support system (CSS) 137 that is a remote diagnosis system.

The system controller 130 includes a central processing unit (CPU) 134. The memory unit 131 has a volatile memory 136 and a nonvolatile memory 138. Further, the memory unit 131 stores a log processing program 135. The CPU 134 of the system controller 130 executes the log processing program 135 to collect log information at the time of an emergency such as interruption of communication with the second MFP 2 from the second MFP 2 when communication is restored. As a result, it is possible to analyze a cause of the communication interruption, etc. Details will be described later.

Similarly to the first MFP 1, in addition to the image forming device 170 having the image forming function(s), the second MFP 2 includes a system controller 140, a memory unit 141, a reading unit 142, a writing unit 143, and a CSS 150.

The system controller 140 includes a CPU 144. The memory unit 141 includes a volatile memory 146 (an example of a first storage unit) and a nonvolatile memory 148 (an example of a second storage unit). Further, the memory unit 141 stores a log processing program 145. The CPU 144 of the system controller 140 executes the log processing program 145 to store log information at the time of interruption of communication with the first MFP 1, and transmits the log information to the first MFP 1 when communication is restored. As a result, it is possible to analyze a cause at the time of the communication interruption, etc. Details will be described later.

The first MFP 1 and the second MFP 2 are interconnected by the normal signal line 154 and the emergency signal line 180. The first MFP 1 and the second MFP 2 normally communicate with each other via the normal signal line 154. When communication is interrupted, occurrence of communication interruption is notified from a master-side CPU to a slave-side CPU via the emergency signal line 180 (communication interruption notification signal). The slave-side CPU receiving the communication interruption notification signal (an example of a communication abnormality signal) saves and stores log information at the time of occurrence of the abnormality in the nonvolatile memory. Then, when communication is restored, the slave-side CPU reads the log information at the time of occurrence of communication interruption from the nonvolatile memory, and transmits the log information to a mater-side MFP via the normal signal line 154. In this way, it is possible to analyze the log information at the time of occurrence of communication interruption. The log information is an example of record information.

Inconvenience at the Time of Communication Interruption

Figure 2:
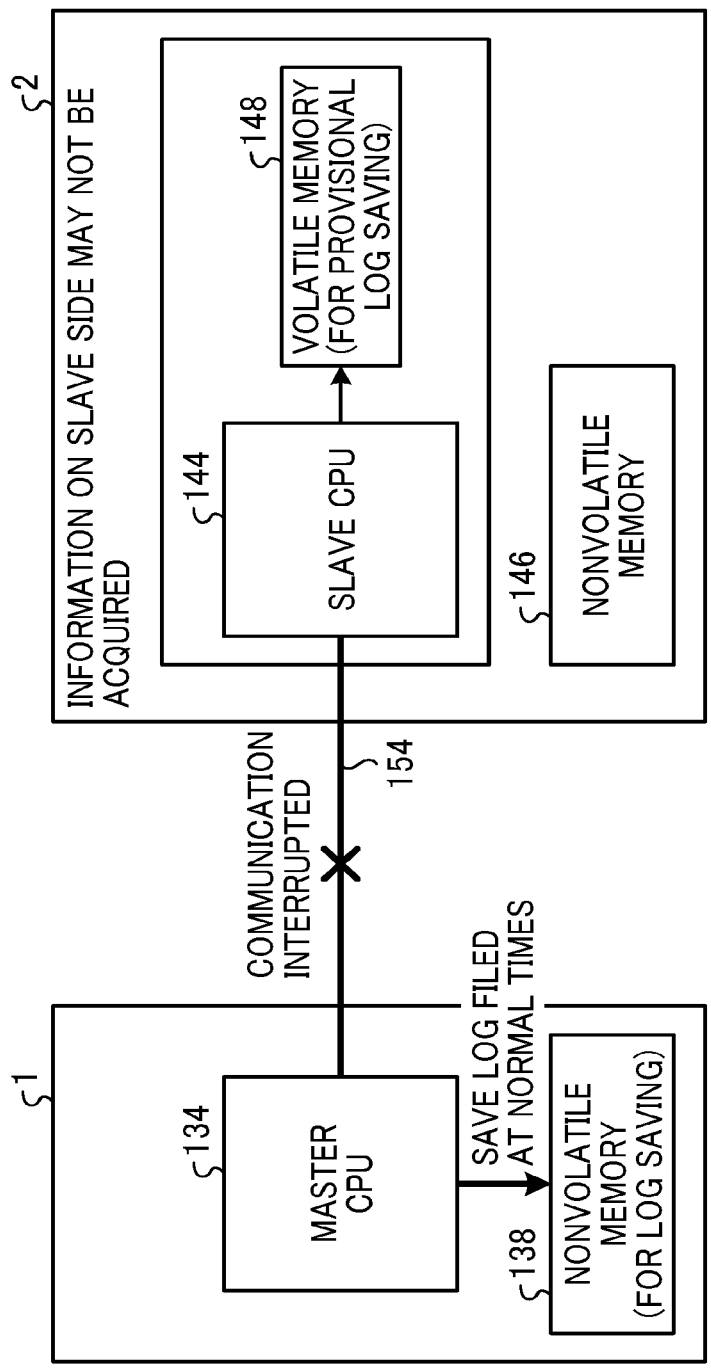
FIG. 2 is a block diagram for description of inconvenience when communication of each multifunction peripheral (MFP) is interrupted.

Here, a description will be given of an inconvenience at the time of communication interruption of each of the MFPs 1 and 2 based on FIG. 2. For example, it is presumed that the first MFP 1 and the second MFP 2 are interconnected by the normal signal line 154 (an example of a first signal line), the CPU 134 of the first MFP 1 operates as a master CPU, and the CPU 144 of the second MFP 2 operates as a slave CPU. The master CPU 134 of the first MFP 1 controls the entire first MFP 1 and peripheral devices connected to the first MFP 1. Similarly, the CPU 144 of the second MFP 2 controls the entire second MFP 2 and peripheral devices connected to the second MFP 2.

The CPU 134 of the first MFP 1 on the master side and the CPU 144 of the second MFP 2 on the slave side communicate with each other. The master-side CPU 134 stores, in the nonvolatile memory 138, log information indicating operation states of the own device and the peripheral device. The slave-side CPU 144 temporarily stores log information indicating operation states of the own device and the peripheral device in the volatile memory 146, and transmits the log information to the first MFP 1 at a predetermined timing. The master CPU 134 of the first MFP 1 stores the log information acquired from the second MFP 2 in the nonvolatile memory 138. In this way, when an abnormality occurs, by analyzing the log information on the first MFP 1 side stored in the nonvolatile memory 138 of the first MFP 1 and the log information on the second MFP 2 side, it is possible to investigate a cause of the occurrence of the abnormality.

Figure 3:
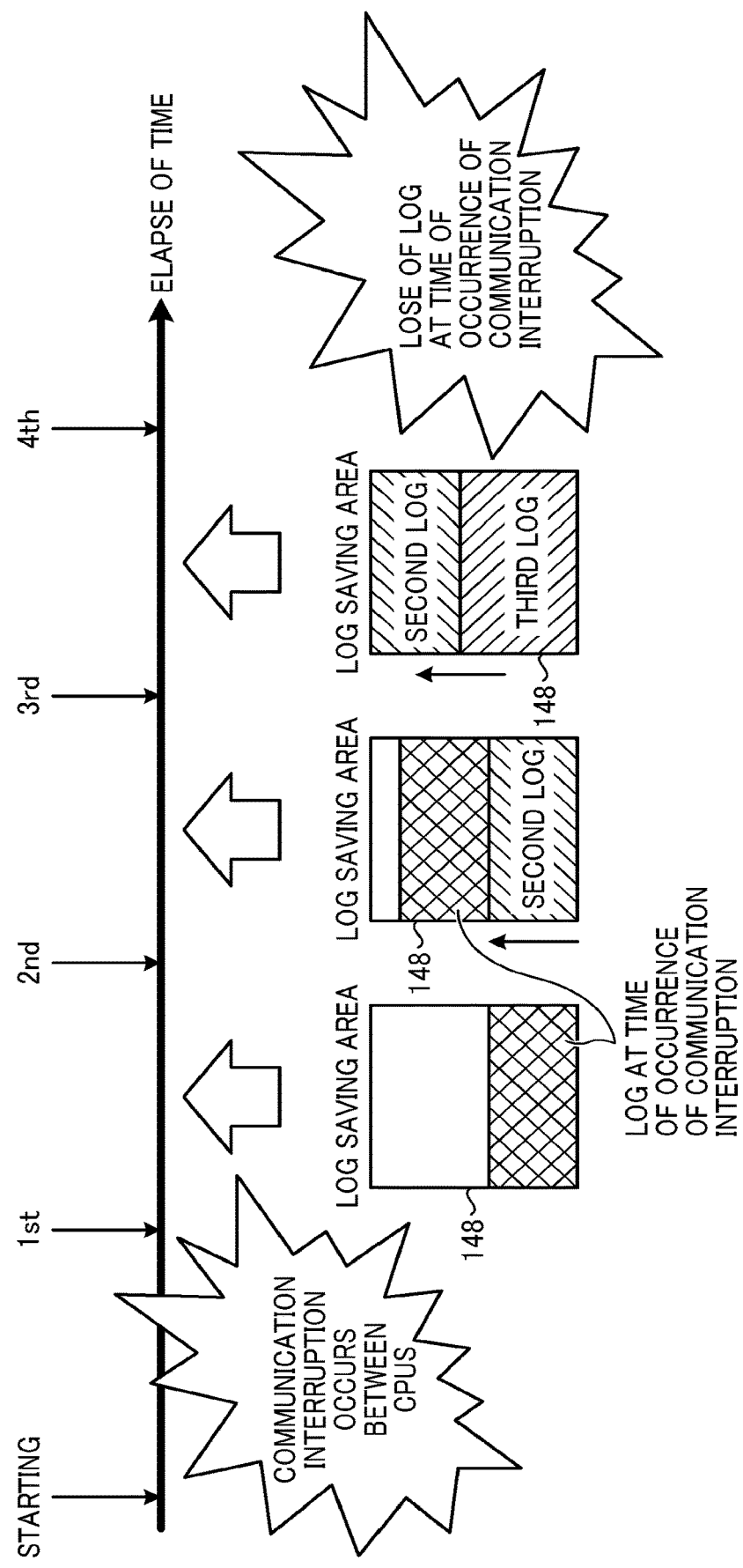
FIG. 3 is a schematic view for description of inconvenience when communication of each MFP is interrupted.

Here, as illustrated in FIG. 3, it is presumed that immediately after the master-side CPU 134 starts communication with the slave-side CPU 144 (immediately after starting), communication between the respective CPUs 134 and 144 is interrupted. In this case, log information (communication interruption occurrence log information: an example of communication abnormality record information) corresponding to communication interruption occurring immediately after starting the communication is formed by the slave-side CPU 144 and temporarily stored in the volatile memory 146.

The temporarily stored communication interruption occurrence log information is transmitted from the second MFP 2 on the slave side to the first MFP 1, and is stored in the nonvolatile memory 138 of the first MFP 1. However, when communication interruption between the respective CPUs 134 and 144 occurs, the communication interruption occurrence log information may not be transferred from the second MFP 2 to the first MFP 1, and the communication interruption occurrence log information is temporarily stored in the volatile memory 146 of the second MFP 2. In this state, when subsequent log information (second log, third log . . . ) is formed, the subsequent log information is overwritten on the communication interruption occurrence log information, and the inconvenience of losing the communication interruption occurrence log information occurs.

For this reason, the image forming system of the embodiment connects the master-side MFP and the slave-side MFP with each other via the normal signal line 154, and connects the master-side MFP and the slave-side MFP with each other via the emergency signal line 180 (an example of a second signal line). Then, when communication interruption of the normal signal line 154 occurs, a communication interruption notification signal is transmitted from the master-side MFP to the slave-side MFP via the emergency signal line 180. Upon receiving the communication interruption notification signal, the slave-side MFP saves and stores log information at the time of occurrence of the abnormality in the nonvolatile memory. Then, when the normal signal line 154 is restored, the slave-side MFP reads the log information at the time of occurrence of communication interruption from the nonvolatile memory, and transmits the log information to the mater-side WP via the normal signal line 154. In this way, it is possible to analyze the log information at the time of occurrence of communication interruption.

Function Based on Log Processing Program

Such operation at the time of occurrence of communication interruption is implemented by the respective CPUs 134 and 144 on the master side and the slave side executing the log processing program 135 or the log processing program 145 illustrated in FIG. 1. The log processing program 135 or the log processing program 145 is a program having the same function, and the CPU operating as the master side implements the function on the master side based on the log processing program. Further, the CPU operating as the slave side implements the function on the slave side based on the log processing program.

Figure 4:
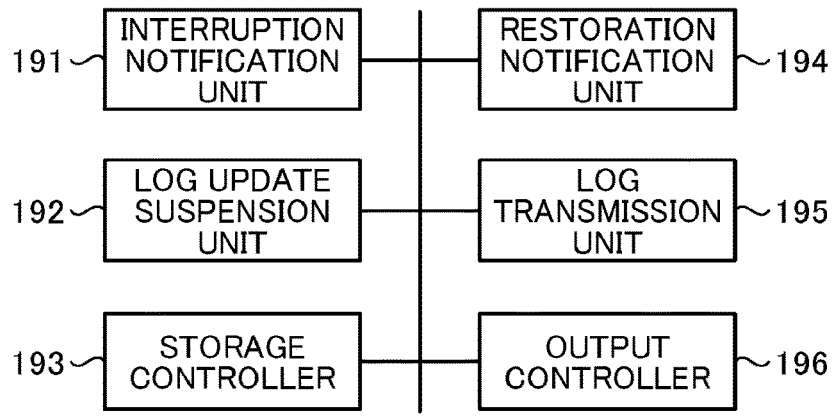
FIG. 4 is a functional block diagram of each function implemented by executing a log processing program.

That is, FIG. 4 is a functional block diagram of each function implemented by executing the log processing program 135 or the log processing program 145. As illustrated in FIG. 4, when the log processing program 145 is executed, respective functions of an interruption notification unit 191, a log update suspension unit 192, a storage controller 193, a restoration notification unit 194, a log transfer unit 195, and an output controller 196 are implemented. The master-side CPU selects and executes the master-side function among these functions, and the slave-side CPU selects and executes the slave-side function among these functions.

System Operation when Communication Interruption Occurs

Figure 5:
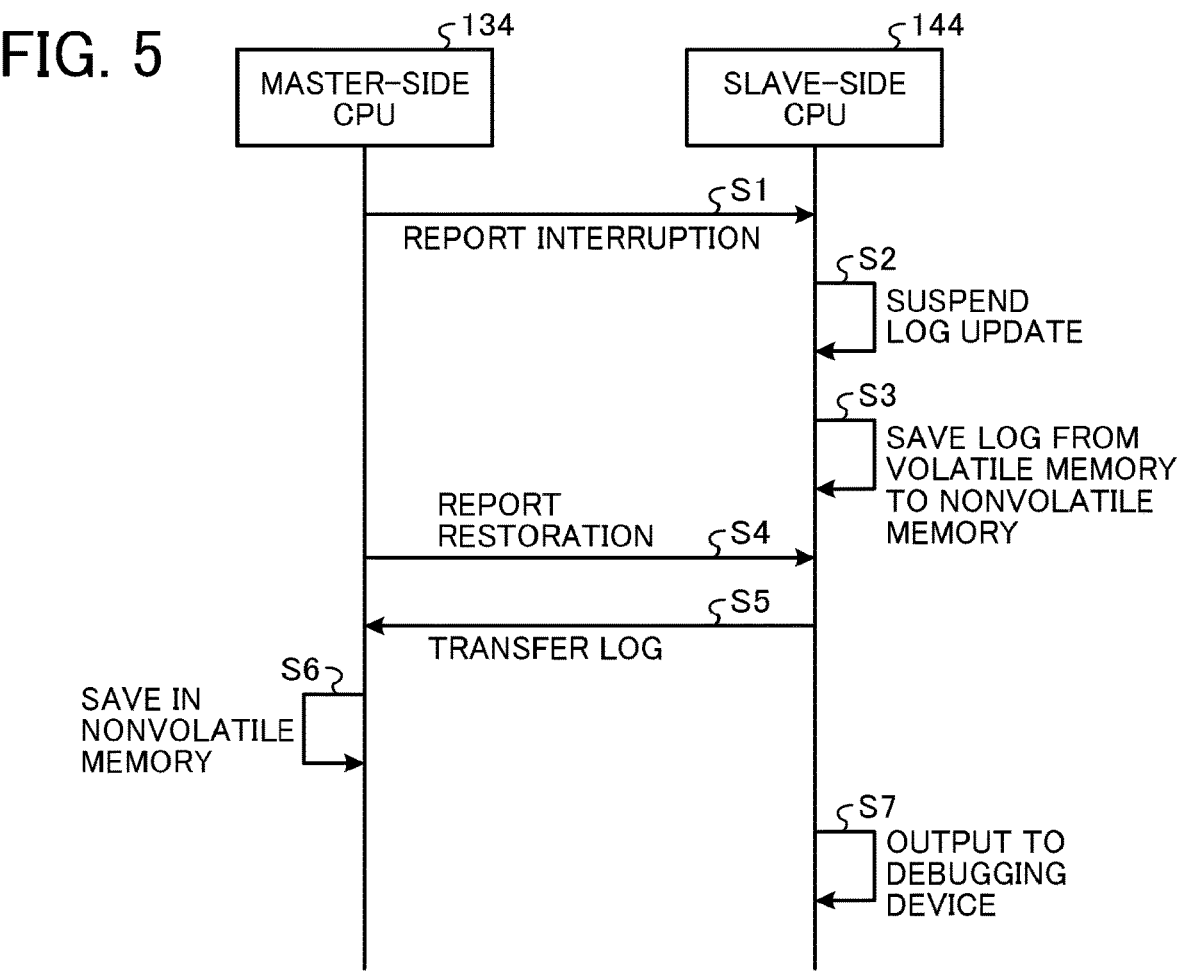
FIG. 5 is a sequence diagram illustrating a system operation of an image forming system of a first embodiment when communication interruption occurs.
Figure 6:
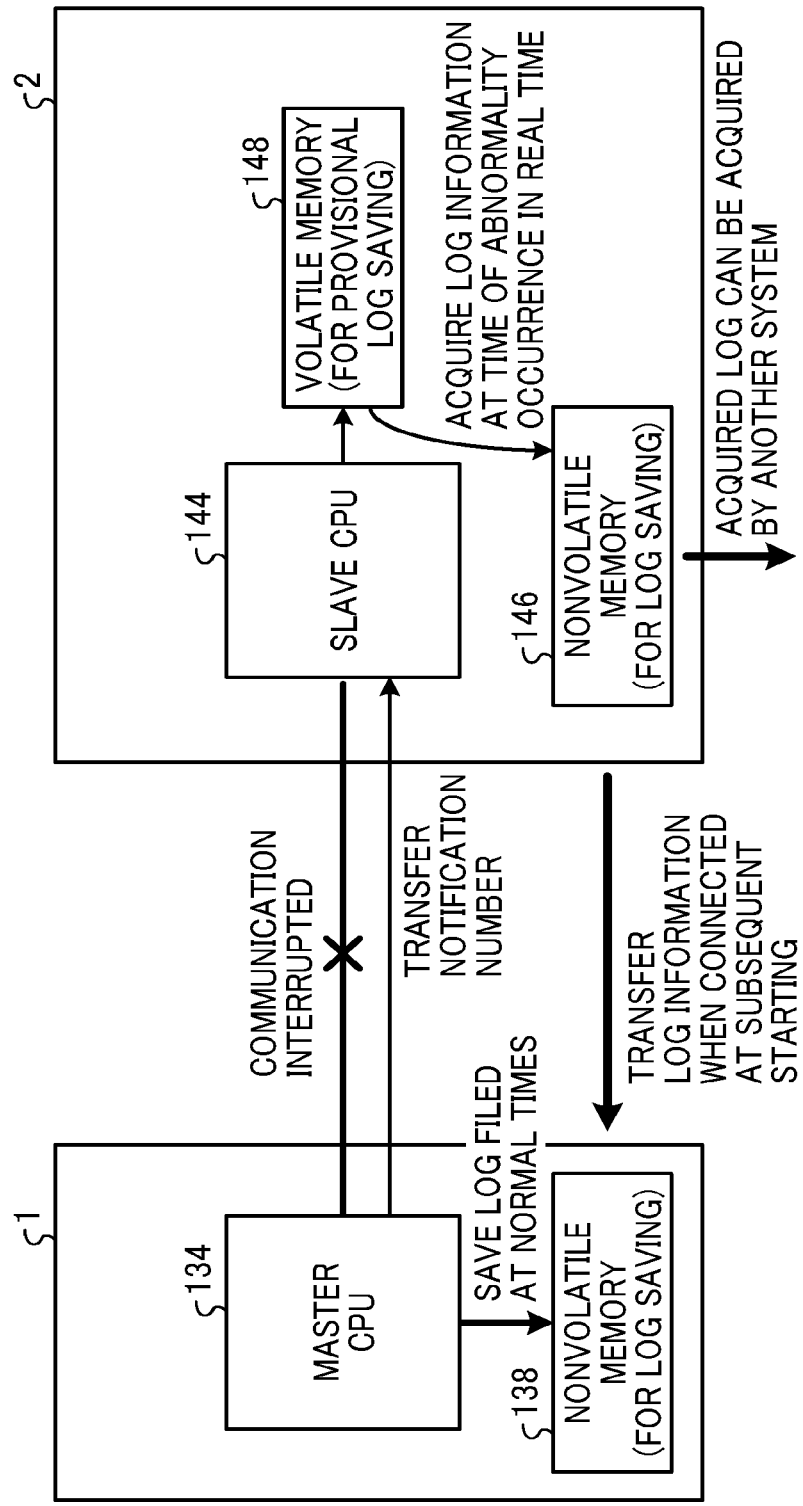
FIG. 6 is a diagram schematically illustrating a system operation of the image forming system of the first embodiment when communication interruption occurs.

FIG. 5 is a sequence diagram illustrating a system operation when communication interruption occurs. In addition, FIG. 6 is a diagram schematically illustrating a system operation when communication interruption occurs. Note that, as an example, the CPU 134 of the first MFP 1 is set to the master-side CPU, and the CPU 144 of the second MFP 2 is set to the slave-side CPU.

While communication is normally performed between the first MFP 1 and the second MFP 2, the log information generated by the second MFP 2 is read from the volatile memory 146 as an example of the first storage unit or a first memory by the storage controller 193 as an example of a storage controller, transmitted to the first MFP 1 via the normal signal line 154 as an example of a first signal line by the output controller 196 as an example of a transmission unit, and stored in the nonvolatile memory 138.

However, as illustrated in FIG. 5 and FIG. 6, when communication interruption of the normal signal line 154 occurs, the master-side CPU 134 functions as the interruption notification unit 191 as an example of an abnormality notification unit to transmit the communication interruption notification signal (notification number) to the slave-side CPU 144 via the emergency signal line 180 as an example of a second signal line (step S1: interruption notification).

Upon receiving the communication interruption notification signal, the slave-side CPU 144 forms log information at the time of occurrence of the abnormality (communication interruption occurrence log information) and temporarily controls storage in the volatile memory 146 as an example of the second storage unit or a second memory. In addition, the CPU 144 functions as the log update suspension unit 192 to suspend a process of updating the log information until the communication abnormality record information is transferred to the nonvolatile memory 148 by the log transfer unit 195 as an example of a transfer unit described later or until communication of the normal signal line 154 is restored (step S2). Then, the slave-side CPU 144 functions as the log transfer unit 195 to transfer the communication interruption occurrence log information from the volatile memory 146 to the nonvolatile memory 148 and save the communication interruption occurrence log information. As a result, erroneous erasure due to updating of the log information and erroneous erasure due to non-energization of the nonvolatile memory 148 are prevented, so that it is possible to protect the communication interruption occurrence log information.

In this example, when an abnormality occurs, after the process of updating the volatile memory 146 is suspended, the communication interruption occurrence log information stored in the volatile memory 146 is transferred to the nonvolatile memory 148 and saved. However, when the communication interruption notification signal is supplied via the emergency signal line 180, the log update suspension unit 192 may not suspend update of the log information, and the log transfer unit 195 may immediately transfer the communication interruption occurrence log information stored in the volatile memory 146 to the nonvolatile memory 148 and save the communication interruption occurrence log information. In this case, the log update suspension unit 192 may not be used, and program configurations of the log processing programs 135 and 145 may be simplified.

Subsequently, when communication with the slave-side CPU 144 via the normal signal line 154 is restored, the master-side CPU 134 functions as the restoration notification unit 194 and transmits restoration notification to the slave-side CPU 144 (step S4). Upon receiving the restoration notification, the slave-side CPU 144 functions as the storage controller 193 to read the communication interruption occurrence log information saved in the nonvolatile memory 148. In addition, the slave-side CPU 144 functions as the output controller 196 as an example of the transmission unit to transfer the communication interruption occurrence log information read from the nonvolatile memory 148 to the master-side CPU 134 via the restored normal signal line 154 (step S5).

The master-side CPU 134 functions as the storage controller 193 as an example of a communication abnormality storage controller to control storage of the communication interruption occurrence log information received from the slave-side CPU 144 in the nonvolatile memory 138 as an example of a communication abnormality storage unit on the master side (step S6). In this way, it is possible to acquire the communication interruption occurrence log information formed when communication interruption occurs, and it is possible to analyze investigation of a cause of the occurrence of the communication interruption.

In the case where there is a limit to the allowed number of times of writing in the nonvolatile memory 138, the communication interruption occurrence log information may be written when an abnormality occurs. In this case, the nonvolatile memory 138 can be used for a long time.

Further, in this example, the communication interruption occurrence log information protected on the slave side is stored in the nonvolatile memory 138 on the master side. However, the communication interruption occurrence log information stored in the nonvolatile memory 148 on the slave side may be output to a debugging device (an example of an external device for debugging) externally connected to the slave-side CPU 144. In this case, the slave-side CPU 144 functions as the output controller 196 (an example of an output unit) and outputs the communication interruption occurrence log information read from the nonvolatile memory 148 on the slave side to the debugging device (step S7). In this way, the debugging device can analyze the communication interruption occurrence log information to investigate a cause of the communication interruption.

Effect of Embodiment

As is clear from the above description, the image forming system of the embodiment can save the communication interruption occurrence log information formed when the communication interruption of the normal signal line 154 occurs without losing the communication interruption occurrence log information on the slave side. Then, when the normal signal line 154 is restored, the communication interruption occurrence log information protected on the slave side is transferred to the master side. In this way, it is possible to reliably acquire the communication interruption occurrence log information, which is formed when communication interruption occurs, on the master side, and it is possible to analyze investigation of a cause of the occurrence of the communication interruption.

The communication interruption occurrence log information is formed when communication interruption occurs, which is an example. It should be understood that when any error occurs, error information indicating the occurring error is formed.

Modification

Figure 7:
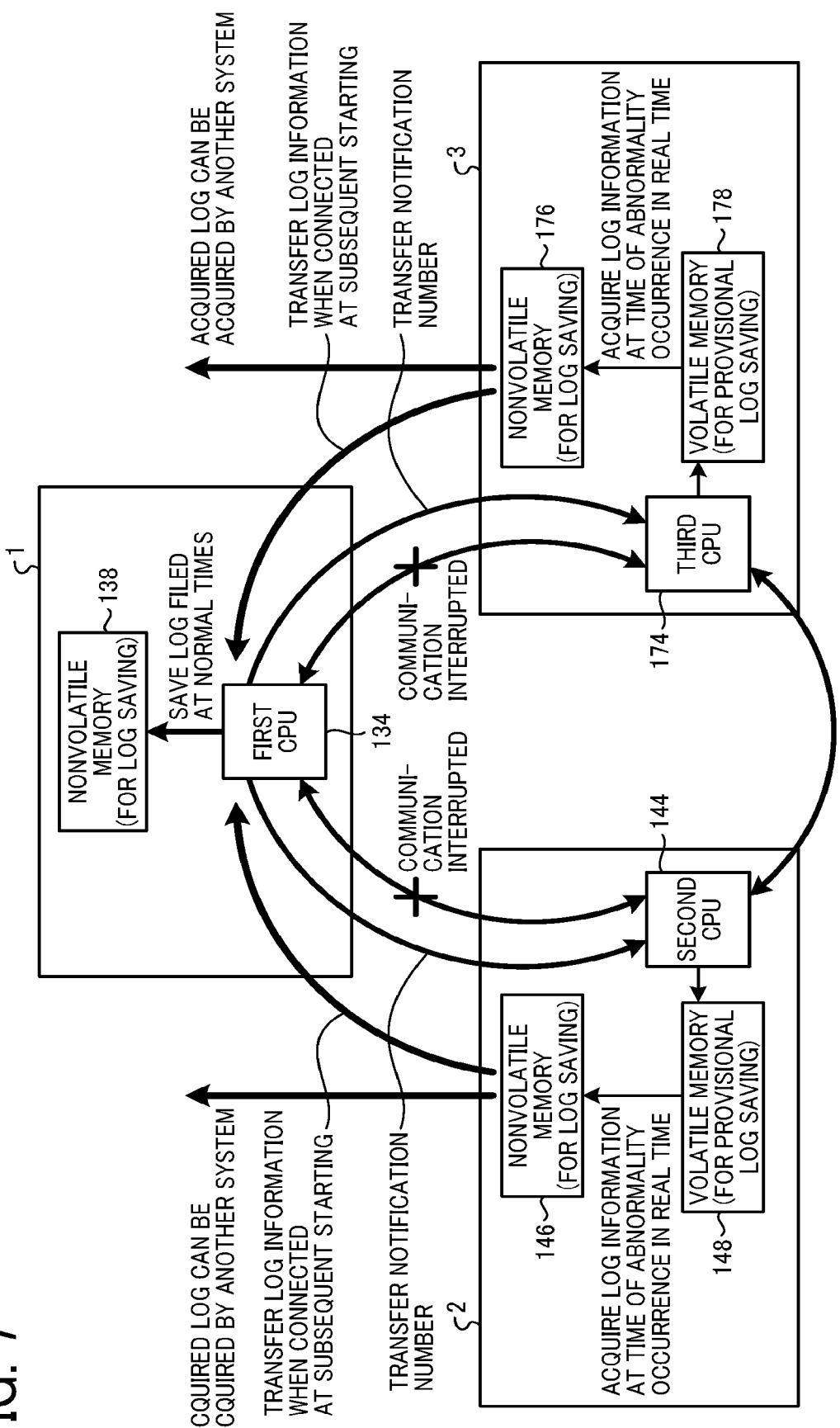
FIG. 7 is a system configuration diagram of an image forming system corresponding to a modification.

In the above embodiment, a total of two MFPs, that is, the first MFP 1 and the second MFP 2 are formed by interconnecting the normal signal line 154 and the emergency signal line 180. Three or more MFPs may be connected to each other. FIG. 7 illustrates an example in which first to third MFPs 1 to 3 are interconnected to by the normal signal line 154 and the emergency signal line 180. In FIG. 7, a first CPU 134 of the first MFP 1 is a main CPU, and controls the first MFP 1 and peripheral devices connected to the first MFP 1. A second CPU 144 of the second MFP 2 is a slave CPU, and controls the second MFP 2 and peripheral devices connected to the second MFP 2. A third CPU 174 of the third MFP 3 is a slave CPU, and controls the third WP 3 and peripheral devices connected to the third MFP 3.

The respective MFPs 1 to 3 are interconnected by the normal signal line 154 and the emergency signal line 180. The first to third CPUs 134, 144, and 174 of the respective MFPs 1 to 3 can operate as master CPUs. When any one CPU operates as a master CPU, the CPUs of the other MFPs operate as slave CPUs.

In this example, the first CPU 134 serving as the master CPU stores log information indicating operation states of the first MFP 1 and the peripheral devices in the nonvolatile memory 138. The second CPU 144 serving as the slave CPU stores log information indicating operation states of the second MFP 2 and the peripheral devices in the volatile memory 146. Similarly, the third CPU 174 serving as the slave CPU stores, in the volatile memory 178, log information indicating operation states of the third MFP 3 and the peripheral devices.

When communication interruption occurs between the first CPU 134 and the third CPU 174, a communication interruption notification signal is transmitted from the first CPU 134 to the third CPU 174 via the above-described emergency signal line 180. The third CPU 174 receiving the communication interruption notification signal suspends a process of updating the log information in the volatile memory 178. Then, the communication interruption occurrence log information formed when the communication interruption occurs is transferred from the volatile memory 178 to the nonvolatile memory 176 and protected.

When the normal signal line 154 is restored, the third CPU 174 transmits the communication interruption occurrence log information protected by the nonvolatile memory 176 to the first CPU 134 via the normal signal line 154. In this way, the first CPU 134 can analyze the communication interruption log information when the communication interruption occurs.

Note that, as described above, the debugging device may be connected to the third MFP 3 and the communication interruption occurrence log information stored in the nonvolatile memory 176 may be output to the debugging device. Further, even when three or more MFPs are connected in this way, the communication interruption log information at the time of occurrence of communication interruption may be saved and reliably referred to during analysis, etc.

Finally, the above-described embodiments have been presented as examples and are not intended to limit the scope of the present invention. The above-described embodiments can be implemented in various other forms, and various omissions, replacements, and changes can be made without departing from the spirit of the present invention.

For example, the above-described embodiments are examples of application to a system in which a plurality of image forming apparatuses such as MFPs is connected to each other. However, even when the image forming apparatus is not used, the present invention may be applied to any system in which devices can communicate with each other. In addition, the embodiments and variations of the respective embodiments are included in the scope and the gist of the present invention, and are included in the invention described in the claims and the equivalents thereof. For example, elements and/or features of different illustrative embodiments may be combined with each other and/or substituted for each other within the scope of the present invention.

Any one of the above-described operations may be performed in various other ways, for example, in an order different from the one described above.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

The invention claimed is:

1. An information processing device, comprising:
control circuitry configured to
store, in a first memory, record information formed each time a predetermined event occurs in the information processing device, and perform an update process of successively updating an old piece of record information with a new piece of record information in the record information stored in the first memory;
transmit, to an external information processing device for storage in an external memory, the record information stored in the first memory, via a first signal line;
transfer communication abnormality record information corresponding to the record information stored in the first memory to a second memory, which is configured not to update record information, and store the communication abnormality record information in the second memory, in response to a communication abnormality signal, indicating a communication abnormality of the first signal line, being supplied via a second signal line from the external information processing device; and
transmit, to the external information processing device, the communication abnormality record information stored in the second memory via the first signal line, in response to communication of the first signal line being restored.

2. The information processing device according to claim 1,
wherein the control circuitry is further configured to output the communication abnormality record information stored in the second memory to an external device for debugging.

3. The information processing device according to claim 1,
wherein the control circuitry is further configured to suspend the update process in the first memory until the communication abnormality record information is transferred to the second memory or until communication of the first signal line is restored, in response to the communication abnormality signal being supplied via the second signal line.

4. The information processing device according to claim 1,
wherein the first memory is a volatile memory, and the second memory is a nonvolatile memory.

5. An image forming apparatus comprising:
the information processing device according to claim 1; and
an image forming device configured to form a predetermined image.

6. The information processing device of claim 1, wherein the first signal line is different from the second signal line.

7. An image forming system, comprising:
a first image forming apparatus configured to form an image; and
a second image forming apparatus configured to form an image;
a first signal line connecting the first image forming apparatus and the second image forming apparatus for communication; and
a second signal line connecting the first image forming apparatus and the second image forming apparatus for communication,
wherein the first image forming apparatus includes first control circuitry configured to:
transmit a communication abnormality signal indicating a communication abnormality of the first signal line to the second image forming apparatus via the second signal line, in response to the communication abnormality of the first signal line being detected; and
acquire communication abnormality record information corresponding to the communication abnormality of the first signal line transmitted from the second image forming apparatus via the first signal line and store the acquired communication abnormality record information in a communication abnormality memory, in response to communication of the first signal line is restored, and
wherein the second image forming apparatus includes second control circuitry configured to:
store, in a first memory, record information formed each time a predetermined event occurs in the second image forming apparatus and perform an update process of successively updating an old piece of record information with a new piece of record information in the record information stored in the first memory;
transmit, to the first image forming apparatus, the record information stored in the first memory via the first signal line; and
transfer the communication abnormality record information corresponding to the record information stored in the first memory to a second memory, which is configured not to update record information, and store the communication abnormality record information in the second memory, in response to the communication abnormality signal, indicating the communication abnormality of the first signal line, being supplied via the second signal line; and
wherein the second control circuitry of the second image forming apparatus further is further configured to transmit the communication abnormality record information stored in the second memory to the first image forming apparatus via the first signal line, in response to communication of the first signal line being restored.

8. An information processing method, comprising:

storing, in a first memory, record information formed each time a predetermined event occurs in a device;

performing an update process of successively updating an old piece of record information with a new piece of record information in the record information stored in the first memory;

transmitting, to an external device for storage in an external memory, the record information stored in the first memory via a first signal line;

transferring communication abnormality record information corresponding to the record information stored in the first memory to a second memory, which is configured not to update record information and causing the second memory to store the communication abnormality record information, in response to a communication abnormality signal, indicating a communication abnormality of the first signal line, being supplied via a second signal line from the external device; and transmitting, to the external device, the communication abnormality record information stored in the second memory via the first signal line, in response communication of the first signal line being restored.

* * * * *